United States Patent [19]

Gunter

[11] Patent Number: 4,538,309
[45] Date of Patent: Sep. 3, 1985

[54] PORTABLE PLAYPEN

[75] Inventor: Rebecca C. Gunter, Birmingham, Ala.

[73] Assignee: Portable Technology, Inc., Birmingham, Ala.

[21] Appl. No.: 551,104

[22] Filed: Nov. 14, 1983

[51] Int. Cl.³ .............................................. A47D 13/06
[52] U.S. Cl. ....................................... 5/99 B; 5/99 A; 5/99 C; 5/98 R; 403/174; 403/205
[58] Field of Search ...................... 5/98 R, 98 A, 98 B, 5/98 C, 99 R, 99 A, 99 B, 99 C, 111, 114; 403/174, 178, 205, 295; 256/25

[56] References Cited

U.S. PATENT DOCUMENTS

| | | | |
|---|---|---|---|
| 1,020,998 | 3/1912 | Mattes | 5/113 |
| 2,464,866 | 3/1949 | Holtz | 5/98 R |
| 2,491,036 | 12/1949 | Dodge | 5/99 A |
| 2,590,315 | 3/1952 | Hawley | 5/98 B |
| 2,784,420 | 3/1957 | Moltane | 5/98 R |
| 3,165,760 | 1/1965 | Abajian | 5/99 R |

FOREIGN PATENT DOCUMENTS

| | | | |
|---|---|---|---|
| 418037 | 0/1929 | Fed. Rep. of Germany . | |
| 1249598 | 9/1967 | Fed. Rep. of Germany | 403/295 |
| 1557841 | 1/1969 | France | 5/99 R |

Primary Examiner—Gary L. Smith
Assistant Examiner—Michael F. Trettel
Attorney, Agent, or Firm—Woodford R. Thompson, Jr.

[57] ABSTRACT

A portable playpen embodies a disassemblable base frame having elongated upright members connected thereto and defining upstanding corner posts for a rectangular enclosure in the form of a one piece fabric unit having rectangular panels defining a box-like compartment having a bottom panel joined along its edges to upstanding side panels with adjoining edge portions of adjacent side panels secured to each other. Sleeve-like members are connected to the adjoining edge portions of adjacent side panels and extend outwardly thereof in position to telescope downwardly over an adjacent corner post with such corner post being in spaced relation to the adjoining edge portions of adjacent side panels. Stop members limit downward movement of the sleeve-like members relative to the corner posts.

10 Claims, 11 Drawing Figures

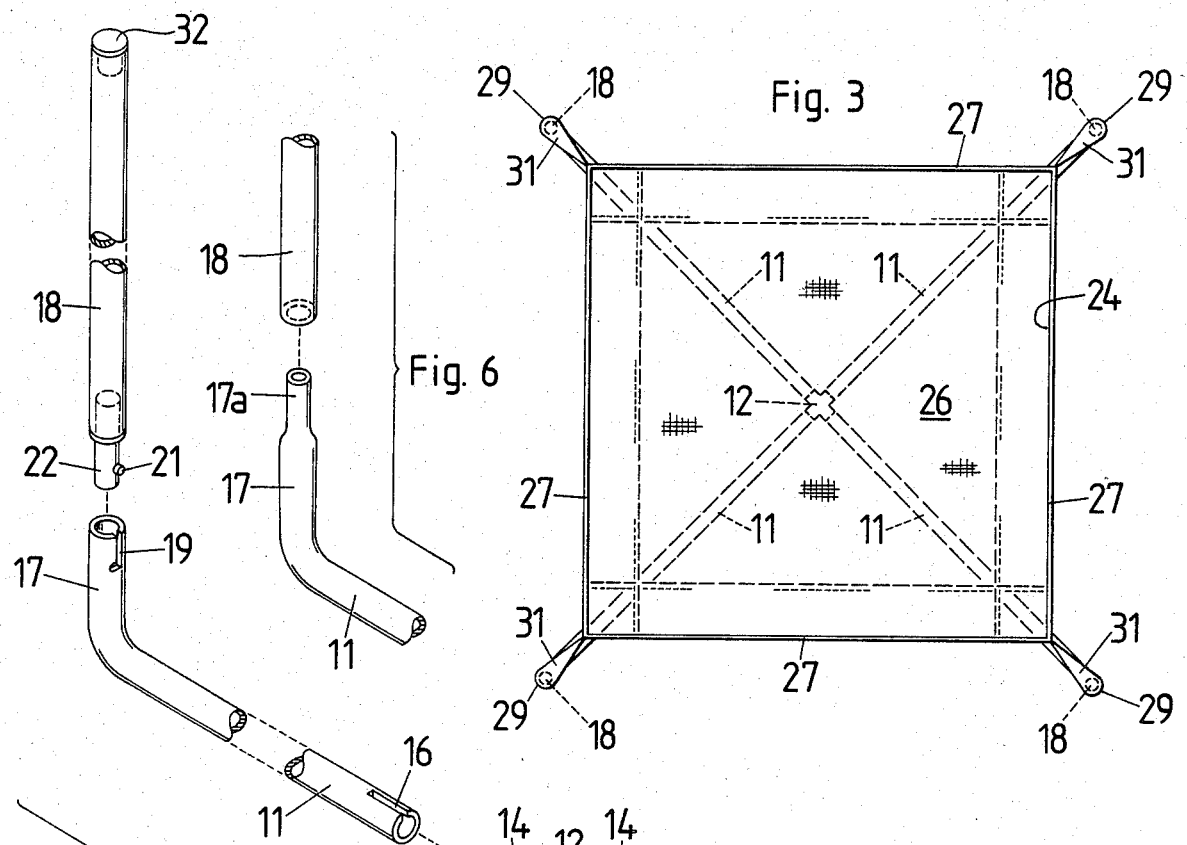
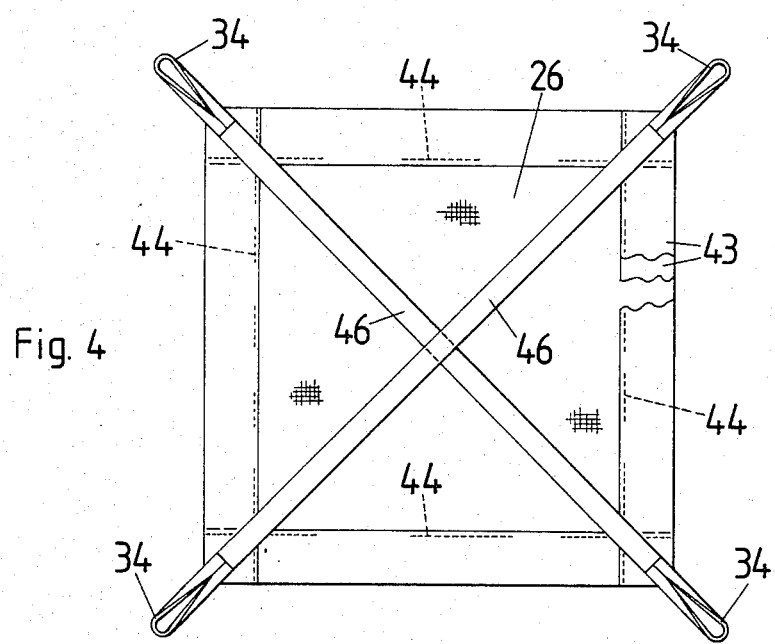

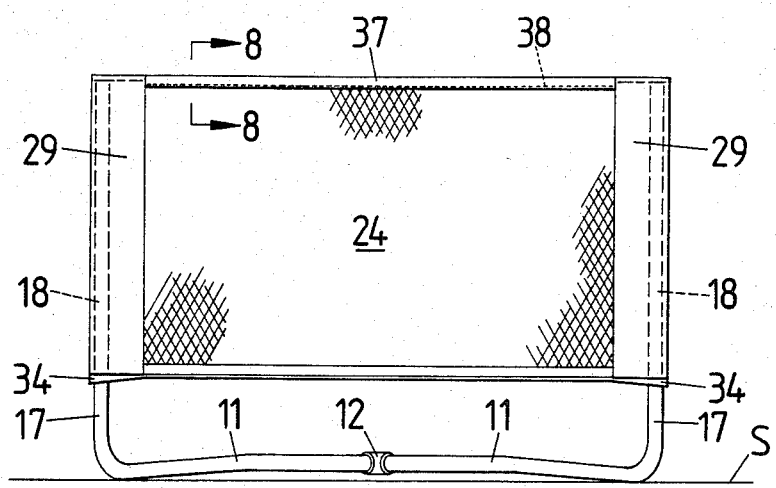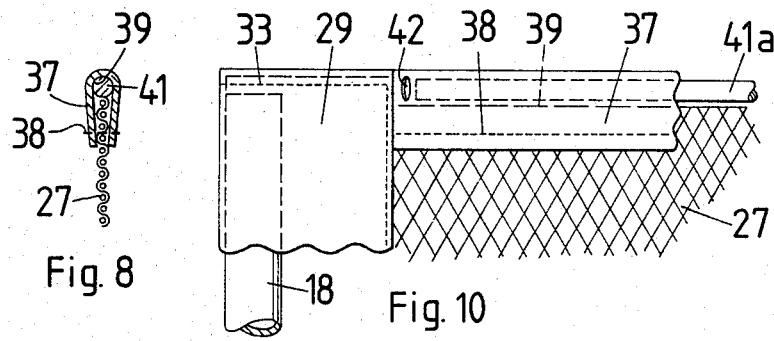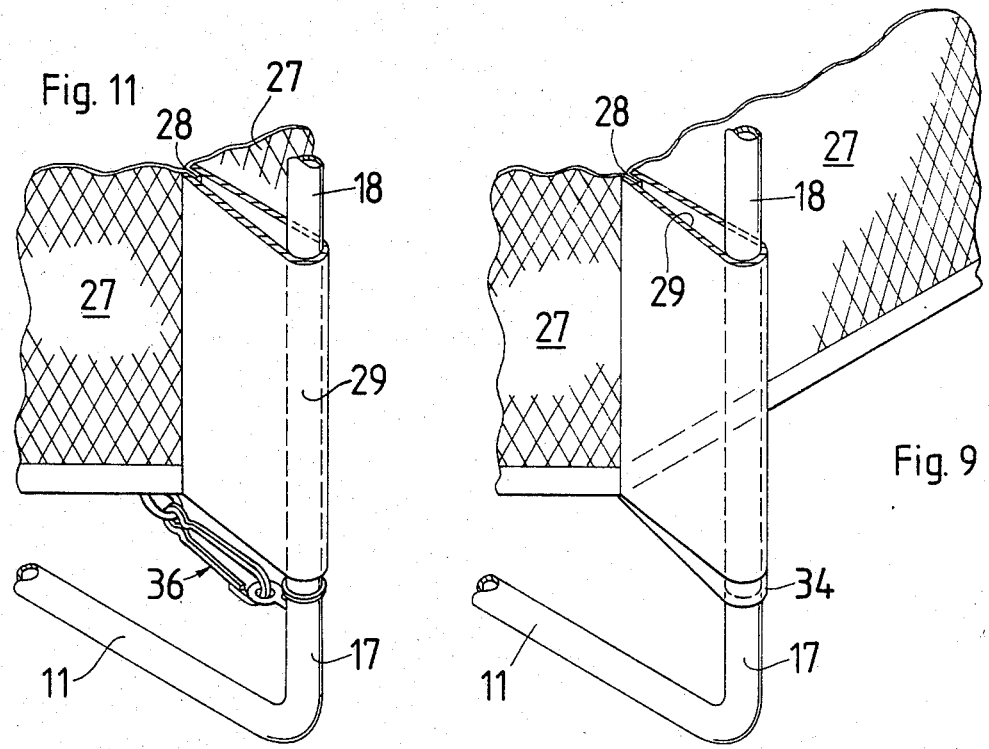

PORTABLE PLAYPEN

BACKGROUND OF THE INVENTION

This invention relates to a portable playpen and more particularly to such a playpen which is durable, light in weight, safe in operation and one which may be readily assembled and disassembled.

Heretofore in the art to which my invention relates, difficulties have been encountered in constructing playpens which are easy to assemble and disassemble and at the same time provide the required safety to a child placed in the playpen.

While the Cirillo U.S. Pat. No. 4,376,318 and the Abajian U.S. Pat. No. 3,165,760 disclose an infant's playpen and crib, the netting forming the side members for the playpen or crib is carried by the horizontally extending upper and lower rails for the playpen or crib. Accordingly, it would be very difficult to separate the netting or fabric portion of the playpen or crib from the supporting frame therefor. Also, the Cirillo Pat. No. 4,376,318 discloses the vertical and horizontal frame members as being hingedly connected to each other. Accordingly, if a side of such a soft-mesh playpen is left folded down, an unattended infant can roll into a pocket formed by the mesh and suffocate. It is a well known fact that children have died when they rolled into the loose mesh pockets formed by the lowered sides of the playpen and suffocated. In view of the fact that drop side mesh playpens and cribs used with a side down can pose a severe health hazard for infants, the Consumer Product Safety Commission has urged juvenile furniture manufacturers to educate parents about the proper use of soft-mesh cribs and playpens that have been blamed for the death of infants. Another hazard encountered with conventional playpens having mesh side walls is that the hinges on the two sides can slip or be reached by the baby or an older child on the outside of the playpen and when triggered it can sever fingers and wrists of an infant. Also, there is a danger of the child injuring itself by falling against the metal frame members supporting the fabric netting.

Another difficulty encountered with conventional soft-mesh playpens is that it is very difficult to thoroughly wash the fabric whereby it is cleaned from baby diaper leaks, spitting-up and any germ-causing material, such as dirt and the like.

BRIEF SUMMARY OF INVENTION

In accordance with my invention, I overcome the above and other difficulties encountered with conventional soft-mesh playpens by providing a portable playpen wherein a one piece fabric portion of flexible material completely covers a disassemblable frame, when assembled, to provide a sturdy, durable stressed fabric construction in which each of the panels defining the bottom and side walls of the playpen is under tension. When it is desired to disassemble the playpen for storage or transportation or wash the fabric portion thereof, the one-piece fabric portion is easily removed from the supporting frame whereby it may be folded into a compact package for storage or transportation or the entire one-piece fabric portion may be placed in a washing machine so that it may be cleaned thoroughly.

My improved portable playpen embodies a disassemblable base frame having elongated upright members which define corner posts for a rectangular, one-piece fabric enclosure having rectangular panels defining a box-like compartment having a bottom panel joined to upstanding side panels with adjoining edge portions of adjacent side panels being secured to each other. Sleeve-like members are connected to the adjoining edge portions and extend outwardly thereof in position to telescope downwardly over an adjacent corner post whereby the corner post is spaced from the adjoining edge portions and the adjacent side panels. Means is interposed between the sleeve-like members and the corner posts to limit relative movement therebetween whereby the upper and lower portions of the fabric enclosure are held in fixed positions relative to the corner posts while the playpen is assembled for use.

An object of my invention is to provide a playpen of the character designated which is safe in operation due to the fact that a side of the playpen cannot be lowered inadvertently after assembly, thus eliminating the possibility of an infant rolling into the loose mesh pocket formed by the lowered side and thus being suffocated. Also, the construction of my improved playpen eliminates the possibility of an infant coming into contact with corner posts for the fabric enclosure or any other supporting frame members which might injure the infant.

A further object of my invention is to provide a playpen of the character designated which may be disassembled and placed in a compact package for storage and shipping. Also, the compact package is particularly adapted for travel and camping due to the fact that the playpen has complete mobility whereby one person can carry both the baby and the playpen at the same time. My improved playpen is also adapted for use in disaster areas where there is no shelter for those who lose their homes from fire, earthquake, tornados, mud-slides, hurricanes, war and the like. This is particularly true due to the fact that the playpen can be stored in large volumes in warehouses or storerooms by civil defense or other organizations.

BRIEF DESCRIPTION OF DRAWINGS

A playpen embodying features of my invention is illustrated in the accompanying drawings, forming a part of this application, in which:

FIG. 3 is a top plan view of the assembled playpen, drawn to a smaller scale;

FIG. 4 is a bottom view of the playpen shown in FIG. 3, partly broken away, with the supporting frame removed;

FIG. 5 is an enlarged, exploded view showing a portion of the supporting frame in disassembled position;

FIG. 6 is a fragmental, exploded view showing a modified form of connection which may be employed between the corner post and the base portion of the supporting frame;

FIG. 7 is a side elevational view of the playpen shown in FIG. 1, drawn to a smaller scale;

FIG. 8 is an enlarged, fragmental sectional view taken generally along the line 8—8 of FIG. 7;

FIG. 9 is an enlarged, fragmental view, partly in section, showing the manner in which the sleeve-like members are connected to the adjoining edge portions of the side panels and to the corner posts for the playpen;

FIG. 10 is a fragmental view showing a modified form of my invention wherein a separate elongated reinforcing member extends through a hem provided along the upper edge of each side panel; and FIG. 11 is a fragmental view showing a further modification wherein a snap-type hook connection is provided between the bottom panel and the corner posts for the playpen.

DETAILED DESCRIPTION

Figure 2:
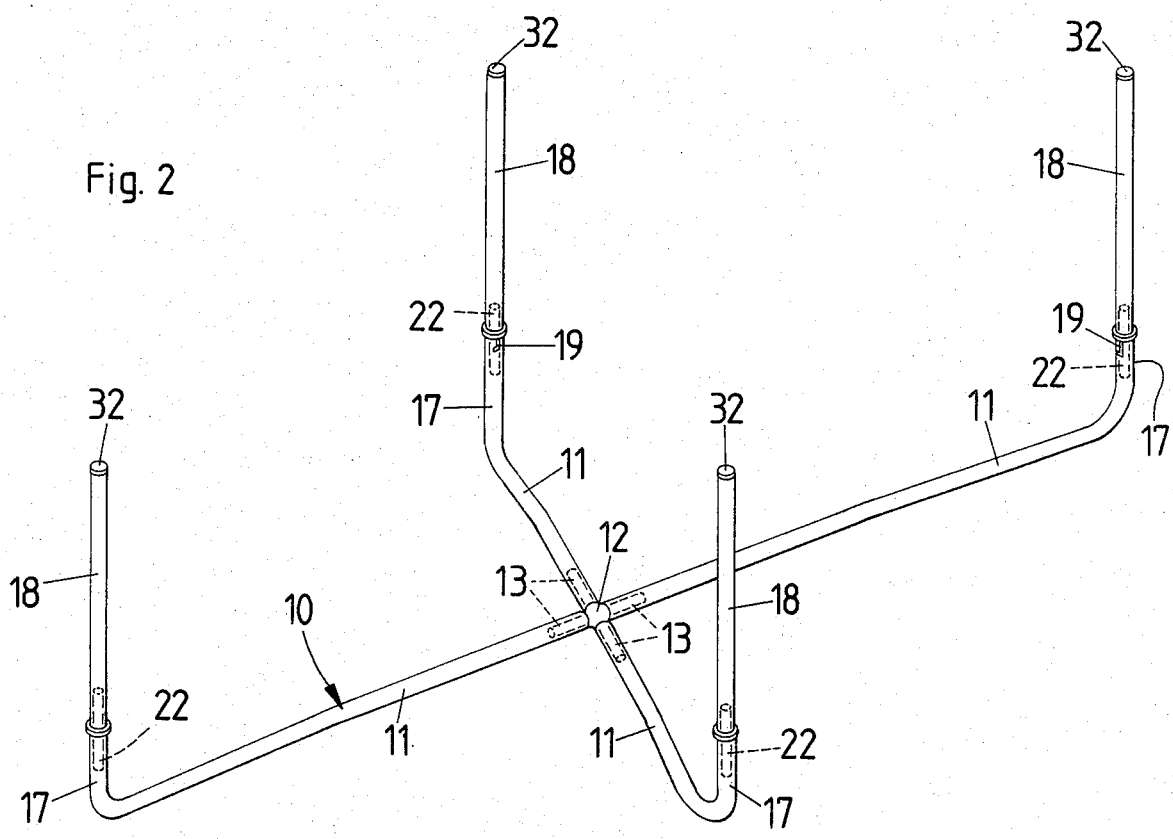
FIG. 2 is a perspective view showing the supporting frame for the playpen in the assembled position with the fabric closure unit removed therefrom.

Referring now to the drawings for a better understanding of my invention, I show a disassemblable base frame 10 which is adapted to rest upon a supporting surface. The base frame 10 is shown as comprising crossed frame members having four angularly spaced elongated members 11 which are detachably connected to a centrally disposed cross member 12, as shown in FIG. 2. The cross member 12 is shown as being in the form of a casting having four angularly spaced rod-like members 13 which extend at right angles to each other, as shown in FIG. 5. The elongated members 11 are shown as being in the form of tubular members which are adapted to telescope over the rod-like members 13 with a friction fit. Longitudinally extending keys 14 are formed integrally with each of the rod-like members 13 in position to engage a longitudinally extending slot 16 provided adjacent the innermost end of each elongated member 11 to prevent rotation of each elongated member 11 relative to its rod-like member 13 after installation.

The outermost portion of each elongated member 11 is turned upwardly to form an upturned member 17 which is detachably connected to a tubular corner post 18. In FIGS. 2 and 5, the upturned member 17 is shown as being connected to the lower end of its corner post 18 by a bayonet-type connection. That is, a bayonet slot 19 is provided adjacent the upper end of the upturned member 17 in position to receive a laterally projecting pin 21 carried by the lower end of a rod-like member 22. The upper end of the rod-like member 22 telescopes upwardly into the lower end of the tubular corner post 18, as shown in FIG. 5.

While I have shown the upturned member 17 as being detachably connected to the lower end of each corner post 18 by a bayonet-type connection, it will be apparent that other types of connections may be employed. For example, the uppermost end of the upturned member 17 may be formed of a reduced diameter, as at 17a, whereby it is adapted to telescope upwardly into the lower end of its corner post 18 with a friction fit, as shown in FIG. 6.

As clearly shown in FIG. 7, each of the elongated members 11 is bowed outwardly and downwardly relative to the centrally disposed member 12 to provide four points of contact with the supporting surface S located beneath the corner post 18.

Figure 1:
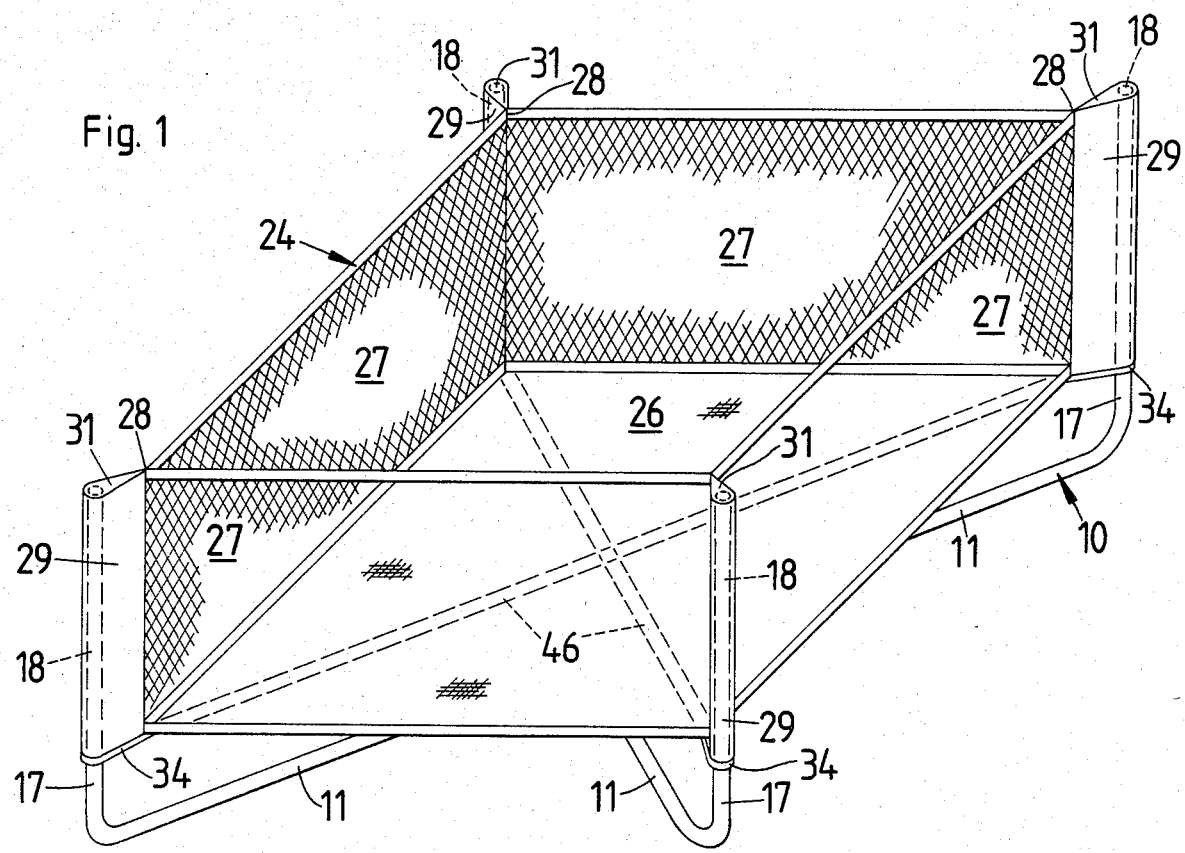
FIG. 1 is a perspective view showing the playpen in the assembled position.

As shown in FIGS. 1, 3, 4 and 7, the upstanding corner posts 18 are in position to support a rectangular enclosure 24. The rectangular enclosure is in the form of a one-piece fabric unit having rectangular panels defining a box-like compartment having a bottom panel 26 joined along its edges to upstanding side panels 27 with adjoining edge portions 28 of adjacent side panels 27 being secured to each other, as shown in FIGS. 1 and 9. A sleeve-like member 29 is connected to each pair of adjoining edge portions 28 of adjacent side panels 27 and extend outwardly thereof in position to telescope downwardly over an adjacent corner post 18 with each corner post 18 being in spaced relation to the adjoining edge portions 28 adjacent thereto. Accordingly, the box-like compartment and its side panels 27 are supported in spaced relation to and inwardly of the corner posts 18.

As shown in FIGS. 1, 3 and 7, the upper end of each sleeve-like member 29 is closed by a fabric closure member 31 which is adapted to engage the uppermost end of its corner post 18 to thus limit downward movement of the sleeve-like member 29 relative to its corner post. As shown in FIGS. 2 and 5, the uppermost end of each corner post 18 is closed by a suitable cap member 32 which facilitates insertion of the sleeve-like members 29 over the upstanding corner posts 18. Also, the cap members 32 have a smooth upper surface with engages the under surface of the closure members 31 to thus prevent damage to the closure members as they engage the tops of the corner posts 18. It will thus be seen that after assembly of the playpen, the sleeve-like members 29 define vertically extending web-like members between the corner posts 18 and the adjacent side walls 27 of the box-like compartment. While I have shown the upper end of each sleeve-like member 29 as being closed by a separate closure member 31, it will be apparent to one skilled in the art that the upper ends of the sleeve-like members 29 may be closed by other means, such as by applying stitches 33 across the upper ends of the sleeve-like members 29, as illustrated in the embodiment shown in FIG. 10.

To retain the lower end of each sleeve-like member 29 at a predetermined location along its corner post 18, retainer means is interposed between the adjoining edge portions 28 and the corner posts 18, as shown. In FIGS. 1, 4, 7 and 9, I show such retainer means as comprising a strap-like loop 34 carried by each corner of the bottom panel 26 in position to encircle the corner posts adjacent thereto. Preferably, the strap-like loop is formed of a resilient material whereby it grips the corner posts 18 with a firm fit to thus hold the lower ends of the sleeve-like members 29 at the same elevation above the supporting surface S, thus stabilizing the bottom panel 26.

In FIG. 11, I show the retainer means for holding the lower ends of the sleeve-like members 29 at selected positions along the corner posts 18 as being in the form of hook and eye-like connectors 36 which detachably connect the adjoining edge portions 28 of adjacent side panels to the corner posts 18 adjacent thereto. It will be apparent to one skilled in the art that other means may be employed to restrain movement of the lower end of each sleeve-like member 29 relative to its corner post.

As shown in FIG. 8, an elongated strip of flexible material 37 is folded over the upper edge of each fabric panel 27 and is secured thereto by suitable means, such as by stitching at 38. As shown in FIG. 8, a space is left between the upper edge of each fabric panel 27 and the inner surface of the elongated flexible strip 27 which defines an elongated passageway 39 for receiving a suitable reinforcing member 41. That is, the elongated flexible strip 37 defines a hem along the uppermost edges of the panels 27 with the elongated passageways 39 being in position to receive an elongated reinforcing member, which may be in the form of an elongated flexible member, such as a cord, small rope, semi-rigid member or the like.

In FIG. 10, I show a separate elongated reinforcing member 41a which may be in the form of a semi-rigid rod-like member having a transverse diameter ranging from approximately ⅜ths of an inch to ½ of an inch. To facilitate insertion of the separate rod-like member 41a into the passageway 39 defined between the upper edge of the side panel 27 and the inner surface of the elongated strip of material 37, a small opening 42 is provided adjacent at least one end of the elongated strip 37 for receiving the rod-like member 41a. Each opening 42 may be in the form of a buttonhole type which permits easy insertion of the rod-like member 41a into the passageway 39 and easy removal of the rod-like member therefrom.

As shown in FIGS. 1, 7, 9, 10 and 11, the sleeve-like members 29 may be formed of an imperforate material while the side panels 27 are preferably made of mesh-type material. However, it will be apparent to one skilled in the art that the sleeve-like members 29 may also be formed of a mesh type material. Also, portions of the side panels 27 could also be imperforate, if desired.

As shown in FIG. 4, the bottom panel 26 is reinforced along its peripheral edges by employing a plurality of elongated layers of reinforcing fabric 43 adjacent each edge of the bottom panel 26. The layers of fabric 43 are secured to the bottom panel 26 by suitable means, such as by stitching at 44. Also, to reinforce the portion of the bottom panel 26 inwardly of the reinforcing layers 43, I secure crossed reinforcing strap-like members 46 to the bottom panel 26 in position to cross each other adjacent the center of the bottom panel 26 and extend between oppositely disposed corners thereof, as shown in FIG. 4. The strap-like members 46 may also be secured to the bottom panel 26 by stitches or other suitable means.

From the foregoing description, the erection and operation of my improved portable playpen will be readily understood. To assemble the playpen, the four angularly spaced elongated members 11 are detachably connected to the rod-like members 13 with the elongated keys riding in the longitudinally extending slots 16 to thus prevent rotation of the elongated members 11 and hold the upturned portions 17 in their upright positions. The corner posts 18 are then detachably connected to the upstanding portions 17 to provide four corner posts for the playpen. With the base frame assembled, the one-piece fabric unit defining the box-like compartment 24 is then positioned over the base frame with each sleeve-like member 29 in position to telescope downwardly over an adjacent corner post 18. The sleeve-like members 29 are then moved downwardly relative to the corner posts 18 while the lower edges of the sleeve-like members 29 remain at substantially the same elevation. That is, the sleeve-like members at opposite sides of the playpen are moved down short distances alternately until the uppermost ends of the corner posts 18 engage the closed ends or stops 31 at the tops of the sleeve-like members 29. With the lower ends of the sleeve-like members 29 at the same elevation, the bottom panel 26 is supported in a horizontal plane parallel to the supporting surface S, as shown in FIG. 7. The strap-like loops 34 or the connector element 36 may be employed to secure each corner of the bottom panel 26 at the proper elevation relative to its corner post 18, as shown. The retainer members 34 or 36, as the case may be, thus restrains movement of the lower ends of the sleeve-like members 29 relative to the corner posts 18. Accordingly, after assembly, my improved playpen is strong and durable and provides a stressed skin construction in which each corner of the bottom panel and the side panels are under tension.

From the foregoing, it will be seen that I have devised an improved portable playpen which is extremely simple of construction, economical of manufacture and one which may be readily assembled and disassembled with a minimum of effort. Also, by providing a portable playpen which eliminates the possibility of one side thereof being let down either accidentally or inadvertently, I provide a playpen which is safe in operation due to the fact that a child cannot roll into a loose mesh pocket formed by the lowered sides of a soft-mesh playpen and be suffocated. Also, by providing a playpen having a box-like compartment which is spaced from its supporting frame, I eliminate the possibility of a child being injured by falling against a portion of the supporting frame, such as a corner post. Furthermore, by providing a one-piece fabric unit which is completely separable from the supporting frame, my improved one-piece fabric unit may be readily removed and placed in a washing machine for thorough cleaning. Furthermore, by providing a light-weight disassemblable playpen, my playpen is very mobile whereby it is particularly adapted for travel and use at various locations.

While I have shown my invention in several forms, it will be obvious to those skilled in the art that it is not so limited, but is susceptible of various other changes and modifications without departing from the spirit thereof.

What I claim is:

1. A portable playpen comprising:
   (a) a disassemblable base frame disposed to rest on a supporting surface,
   (b) elongated upright members connected to said base frame in position to define upstanding corner posts,
   (c) a one piece fabric unit having rectangular panels defining a box-like compartment having a bottom panel joined along its edges to upstanding side panels with adjoining edge portions of adjacent side panels secured to each other,
   (d) sleeve-like members connected to said adjoining edge portions of adjacent side panels and extending outwardly thereof in position to telescope downwardly over an adjacent corner post with each said adjacent corner post in spaced relation to said adjoining edge portions adjacent thereto with said sleeve-like members defining vertically extending web-like members between said corner posts and said box-like compartment so that said box-like compartment is supported inwardly of and in spaced relation to said corner posts, and
   (e) means limiting downward movement of said sleeve-like members relative to said corner posts.

2. A portable playpen as defined in claim 1 in which said disassemblable base frame comprises crossed frame members adapted to extend beneath said bottom panel and having four angularly spaced elongated members detachably connected to a centrally disposed cross member and extending outwardly relative to the center of said bottom panel with said elongated members being bowed outwardly and downwardly relative to the center of said bottom panel to provide four points of contact with said supporting surface beneath said corner posts, with the outermost portions of said elongated members in the form of upturned members which are detachably connected to said corner posts.

3. A portable playpen as defined in claim 2 in which said upturned members are connected to said corner posts by telescopic connections.

4. A portable playpen as defined in claim 1 in which the uppermost ends of said sleeve-like members are closed to provide stops in position to engage the uppermost ends of said corner posts and limit downward movement of said sleeve-like members relative to said corner posts.

5. A portable playpen as defined in claim 1 in which retainer means operatively connects each corner of said bottom panel to the corner post adjacent thereto while said sleeve-like members are telescoped downwardly over said corner posts to thus restrain movement of said bottom panel relative to said corner posts.

6. A portable playpen as defined in claim 5 in which said retainer means comprises a strap-like loop carried by each corner of said bottom panel in position to encircle the corner posts adjacent thereto, and crossed reinforcing strap-like members carried by said bottom panel in position to cross each other adjacent the center of said bottom panel and extend between oppositely disposed corners of said bottom panel, with said strap-like members being connected at each corner to said strap-like loop.

7. A portable playpen as defined in claim 1 in which a hem is provided along the upper edges of said side panels to define elongated passageways adjacent said upper edges, and at least one elongated reenforcing member extends through said passageways.

8. A portable playpen as defined in claim 7 in which a separate elongated reinforcing member extends through said hem provided along the upper edge of each said side panel.

9. A portable playpen as defined in claim 8 in which said separate elongated reinforcing member is a semi-rigid member of a diameter ranging from approximately $\frac{3}{8}$ of an inch to $\frac{1}{2}$ of an inch.

10. A portable playpen as defined in claim 8 in which said separate elongated reinforcing member is removable from its hem and at least one access opening is provided in its hem for inserting and removing said separate elongated reenforcing member.

* * * * *